United States Patent
Nefcy et al.

(10) Patent No.: US 9,340,199 B1
(45) Date of Patent: May 17, 2016

(54) METHOD OF BRAKING IN HYBRID VEHICLE

(71) Applicant: Ford Global Technologies, LLC, Dearborn, MI (US)

(72) Inventors: Bernard D. Nefcy, Novi, MI (US); Francis Thomas Connolly, Ann Arbor, MI (US); Daniel Scott Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/566,153

(22) Filed: Dec. 10, 2014

(51) Int. Cl.
| | |
|---|---|
| *B60L 9/00* | (2006.01) |
| *B60W 20/00* | (2016.01) |
| *B60W 30/18* | (2012.01) |
| *B60W 10/06* | (2006.01) |
| *B60W 10/08* | (2006.01) |
| *B60W 10/184* | (2012.01) |

(52) U.S. Cl.
CPC ......... *B60W 20/1062* (2013.01); *B60W 10/06* (2013.01); *B60W 10/08* (2013.01); *B60W 10/184* (2013.01); *B60W 30/18127* (2013.01); *Y10S 903/93* (2013.01)

(58) Field of Classification Search
CPC ........ B60K 6/365; B60K 6/383; B60W 10/06
USPC ............................ 701/22; 180/65.275, 65.25
See application file for complete search history.

(56) References Cited

U.S. PATENT DOCUMENTS

| | | | |
|---|---|---|---|
| 7,971,667 B2 | 7/2011 | Yamazaki | |
| 8,135,526 B2 | 3/2012 | Minarcin et al. | |
| 2005/0282675 A1* | 12/2005 | Oliver | B60K 6/365 475/5 |
| 2006/0169509 A1* | 8/2006 | Iida | B60K 31/06 180/170 |
| 2012/0277963 A1 | 11/2012 | Xia et al. | |
| 2013/0297120 A1 | 11/2013 | Reed et al. | |

\* cited by examiner

*Primary Examiner* — Gertrude Arthur Jeanglaud
(74) *Attorney, Agent, or Firm* — David B. Kelley; Brooks Kushman P.C.

(57) ABSTRACT

A method of operating a hybrid electric vehicle coordinates operation of an internal combustion engine, a motor, and friction brakes to mitigate a driveline lash crossing without delaying generation of negative torque. In response to a request to transition from positive torque to negative torque, the engine and motor are controlled to rapidly reduce powertrain torque to a small positive value, slowly reduce powertrain torque through the driveline lash zone, and then rapidly reduce powertrain torque to the target. To avoid delay, the friction brakes are applied in a coordinated manner to supply the negative torque during the transition.

13 Claims, 4 Drawing Sheets

METHOD OF BRAKING IN HYBRID VEHICLE

TECHNICAL FIELD

This disclosure relates to the field of hybrid vehicle controls. More particularly, the disclosure pertains to a method of mitigating lash crossing disturbance while transitioning from positive torque to negative torque wheel torque.

BACKGROUND

In normal vehicle operation, a power source such as an internal combustion engine generates power which is transmitted to vehicle wheels through a drivetrain. In some conditions, however, power flows in the opposite direction through the drivetrain. For example, when a vehicle is slowing under engine compression braking, power flows from the vehicle wheels to the internal combustion engine. The drivetrain often includes gearing that either increases the torque and decreases the speed or increases the speed and decreases the torque. When the torque direction reverses, there may be a brief period of torque interruption as shafts rotate to bring opposite faces of the gear teeth into contact with one another. This is called a lash crossing. Some energy may build up in driveline components during this interval which is released as audible noise or a torque disturbance which may annoy vehicle occupants.

The magnitude of the disturbance is strongly correlated with the rate of change of torque during the lash crossing. To mitigate the impact of a lash crossing, a powertrain controller may limit the rate of change of torque as the torque transitions from positive to negative. Typically, this is not noticeable to vehicle occupants because the negative torque associated with engine braking is far less in magnitude than the positive torque associated with normal driving. However, the magnitude of a negative torque associated with regenerative braking in a hybrid vehicle may be much more than typical engine compression braking.

SUMMARY OF THE DISCLOSURE

A hybrid electric vehicle includes a driveline, an internal combustion engine, an electric motor, friction brakes, and a controller. The driveline delivers a powertrain torque to vehicle wheels while the brakes deliver a braking torque to the vehicle wheels. The driveline may include a variable ratio transmission, a driveshaft, a differential, and left and right axles. The internal combustion engine delivers positive torque to the driveline while the electric motor alternately delivers both positive and negative torque to the driveline. The controller is programmed to respond to a request to transition from positive wheel torque to negative wheel torque in a manner designed to mitigate a driveline lash crossing disturbance. The controller commands the engine and/or electric motor to quickly reduce the powertrain torque from the initial positive value to a small positive threshold value. Then, the controller commands the brakes to exert a negative braking torque while commanding the engine and/or electric motor to slowly reduce the powertrain torque from the small positive threshold to a small negative threshold. Then, the controller commands the brakes to release while commanding the electric motor to rapidly reduce the powertrain torque to the negative target value.

A method of operating a vehicle includes, at regular intervals, commanding an engine and a motor to deliver a powertrain torque and commanding friction brakes to deliver a braking torque. The powertrain torque is equal to a maximum of a Net Wheel Torque Demand (NWTD) and a Regenerative Torque Limit (RTL). The braking torque is equal to a minimum of zero and NWTD minus RTL. The RTL and NWTD may be computed by a powertrain controller and communicated via a controller area network to a brake controller. In response to NWTD changing from positive to negative, RTL is slowly reduced from a positive threshold to a negative threshold to mitigate a driveline lash crossing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
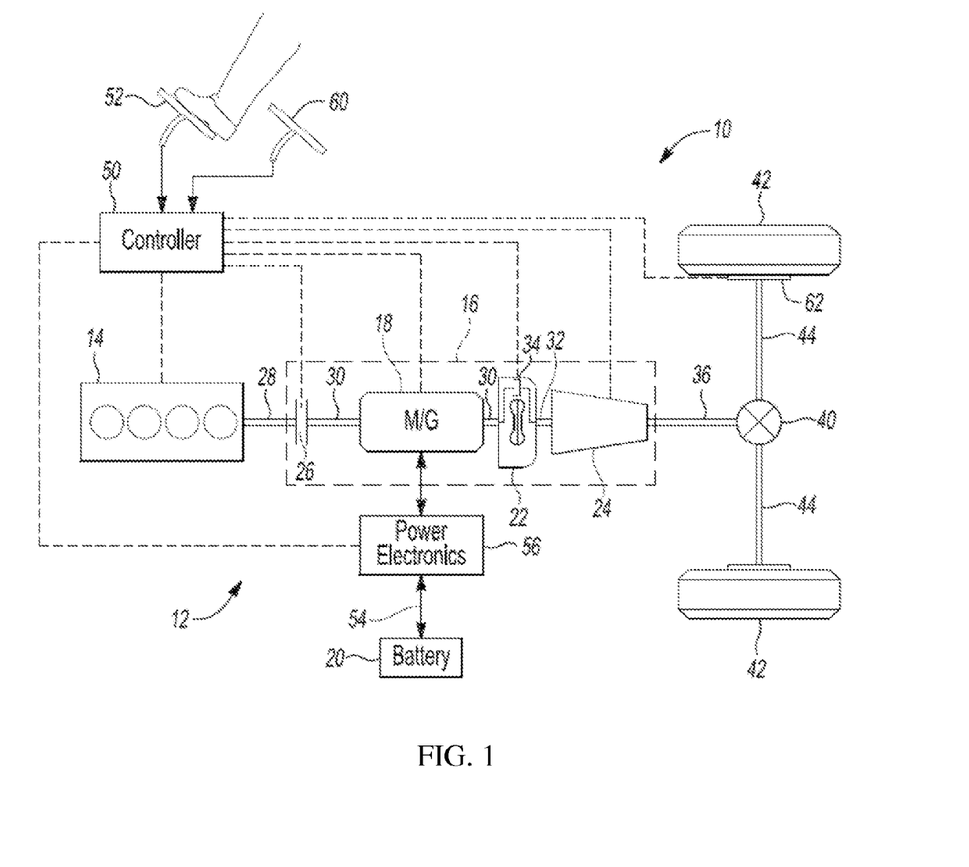
FIG. 1 is a schematic representation of a hybrid vehicle powertrain including a discrete ratio transmission.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, a launch clutch similar to disconnect clutch 26 may be provided between the M/G 18 and gearbox 24 for applications that do not include a torque converter 22.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit 50 (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 is released to isolate the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example.

A brake pedal 60 is used by the driver of the vehicle to provide a demanded negative torque command to slow the vehicle. Similar to accelerator pedal 52, depressing and releasing the brake pedal 60 generates a brake pedal position signal that may be interpreted by the controller 50 as a demand for various degrees of negative torque. Based at least upon input from the brake pedal 60, the controller 50 commands torque from friction brakes 62 and/or the M/G 18. When M/G 18 acts as a generator during times of regenerative braking, energy from the vehicle is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

When negative wheel torque is demanded, controller 50 determines how much negative torque to generate using M/G 18 acting as a generator and how much to generate using friction brakes 62. At any given time, the controller determines a Regenerative Torque Limit (RTL) that indicates the most negative torque M/G 18 is capable of generating at the wheels. This limit may be based on a number of factors including battery state of charge, vehicle speed, and transmission ratio. For example, the limit may be impacted if the battery is fully charged in order to avoid over-charging. Also, the limit may be zero at very low vehicle speeds to improve brake feel. In order to maximize energy recapture, the controller may allocate as much of the target braking torque to the powertrain as possible, as indicated by the Regenerative Torque Limit. The remainder of the negative torque is allocated to friction brakes. Controller 50 may include a powertrain controller and a brake system controller communicating via a controller area network (CAN). In such as configuration, the RTL and NWTD may be computed by the powertrain controller and communicated to the braking controller.

Figure 2:
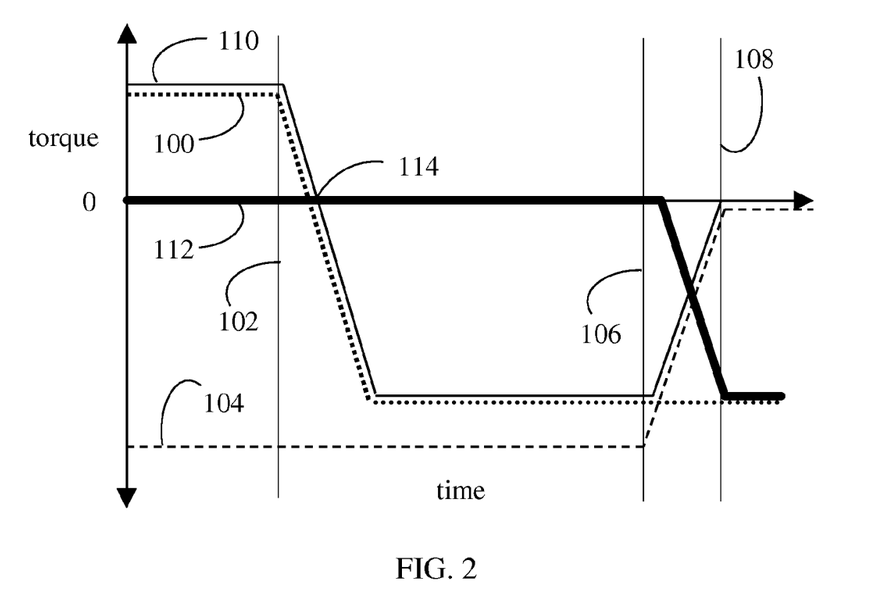
FIG. 2 is a graph illustrating a torque transition likely to generate unsatisfactory noise and torque disturbance during a lash crossing.

FIG. 2 is a graph illustrating behavior of an MHT powertrain during a transition from positive torque to negative torque. Dotted line 100 indicates the Net Wheel Torque Demand (NWTD). The NWTD is based on the positions of the accelerator pedal 52, brake pedal 60, and vehicle speed. The torque demand drops rapidly following release of the accelerator pedal 52 and application of the brake pedal 60 at time 102. Dashed line 104 represents the Regenerative Torque Limit. Notice that the RTL is always less than zero. As the vehicle slows down between time 106 and time 108, the limit transitions gradually from a low value dictated by battery state of charge to zero. The powertrain contribution to wheel torque is indicated by solid line 110. This line tracks the torque demand line 100 until shortly after time 106, when the powertrain torque is phased out as the vehicle slows in accordance with the Regenerative Torque Limit 104. Powertrain torque, in this document, means the sum of the torques delivered to the driving wheels by the driveline from internal combustion engine 14 and M/G 18, after any torque multiplication from transmission 24 and/or any final drive ratio. On the graph, lines are shown slightly offset from each other so that both lines are visible even where they would, in practice, be coincident. Finally, thick solid line 112 represents the wheels torque contributed by the friction brakes 62. Torque from the friction brakes is always zero or negative. The brake torque is zero until slightly after time 106 when friction braking is phased in as the vehicle slows. Brake torque, in this document, means the sum of the torques delivered to all of the wheels by the friction brakes. When the vehicle is moving forward, braking torque is always either zero or negative. Therefore, releasing the brakes may be described as increasing the braking torque.

In FIG. 2, the powertrain torque 110 rapidly transitions from positive values to negative values at 114. Gears in gearbox 24 and differential 40 transmit torque in a positive direction through contact between positive torque tooth faces. When the torque transitions to a negative torque, the opposite side of each tooth transmits the torque. During the transition, the driven gear must rotate slightly relative to the driving gear to bring the opposite tooth faces into contact. This is called a lash crossing. In addition to gear meshes, joints such as spline joints can contribute to the lash in a driveline. The input of the driveline may accelerate while crossing the lash zone and create an audible noise and/or a torque disturbance. The magnitude of the disturbance is strongly correlated with the rate of change of torque during the lash crossing.

Figure 3:
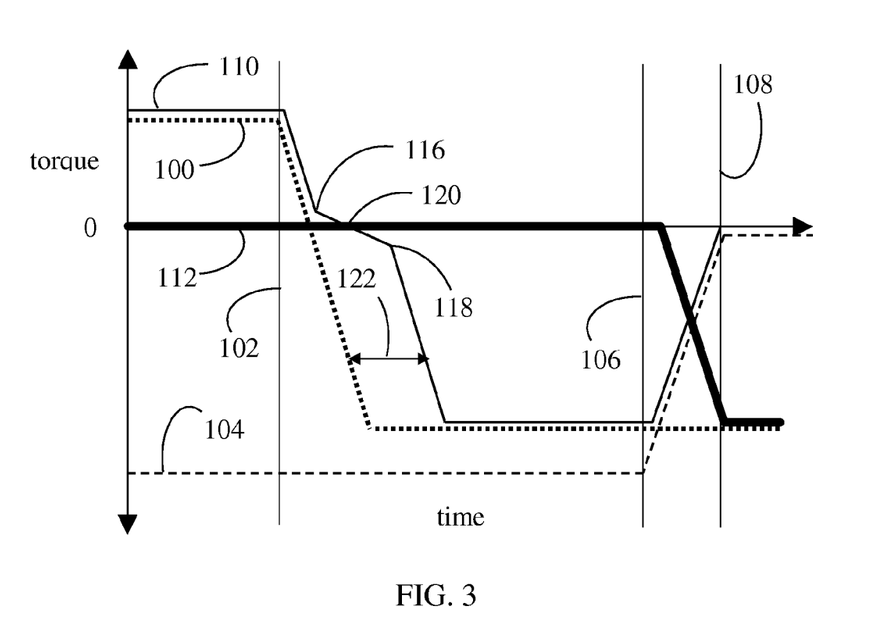
FIG. 3 is a graph illustrating a torque transition that mitigates the noise and torque disturbance of the lash crossing but is likely to generate an unsatisfactory delay in negative wheel torque delivery.

FIG. 3 illustrates a transition using a modified control strategy intended to reduce the torque disturbance and audible noise associated with the driveline lash crossing. The powertrain torque decreases rapidly until a small positive torque value is reached at 116. For example, the torque may be reduced from a powertrain torque of more than 100 Nm in about 250 milliseconds. The small positive torque value is selected just large enough to ensure that the torque throughout the driveline is positive considering both driveline parasitic losses and control accuracy. For example, the small positive value may be on the order of 10 Nm. Then, the powertrain torque is decreased slowly until a small negative torque value is reached at 118. For example, the transition through zero torque may be performed over an interval of about 200-500 milliseconds. The small positive torque value is selected to ensure that the torque throughout the driveline is negative. Since the rate of change is low (in absolute value) during the lash crossing at 120, the magnitude of the disturbance is dramatically reduced. Unfortunately, this modified procedure results in a delay 122 between the time the torque demand is reduced and the time the reduced torque is actually delivered to the wheels.

Figure 4:
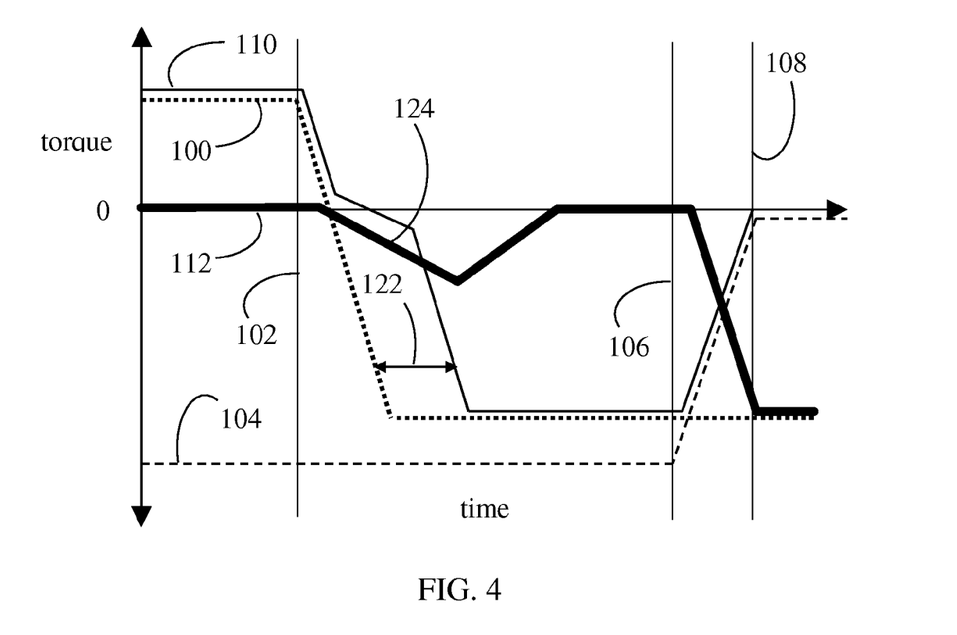
FIG. 4 is a graph illustrating a torque transition that mitigates the noise and torque disturbance of the lash crossing and partially mitigates the delay of FIG. 3.

FIG. 4 illustrates a partial solution to the delay 122. The commanded friction brake torque 112 may include both an open loop term (sometimes called a feed-forward term) and one or more closed loop terms (sometimes called feedback terms). As discussed above, the open loop term may be computed by subtracting the regenerative torque limit 104 from the net wheel torque demand 100. The closed loop terms may be calculated based on the difference between the Net Wheel Torque Demand 100 and the actual net wheel torque. Closed terms may be, for example, proportional to this difference (called a P term), proportional to a derivative of this difference (called a D term), or proportional to an integral of this difference (called an I term). The closed loop terms may result in some application of the friction brakes at 124 in response to the deficiency during the delay, although never enough to eliminate the deficiency. After the delay, the closed loop terms would eventually return to zero. A P or I term would go to zero (or a positive value) quickly, whereas an I term will go to zero only after the net wheel torque is less than the demand (higher in absolute value) for some time. Although the results illustrated in FIG. 4 may be preferable to the results illustrated in FIG. 3, the delivered wheel torque still divergences from the driver's intent for a period of time leading to customer dissatisfaction.

Figure 5:
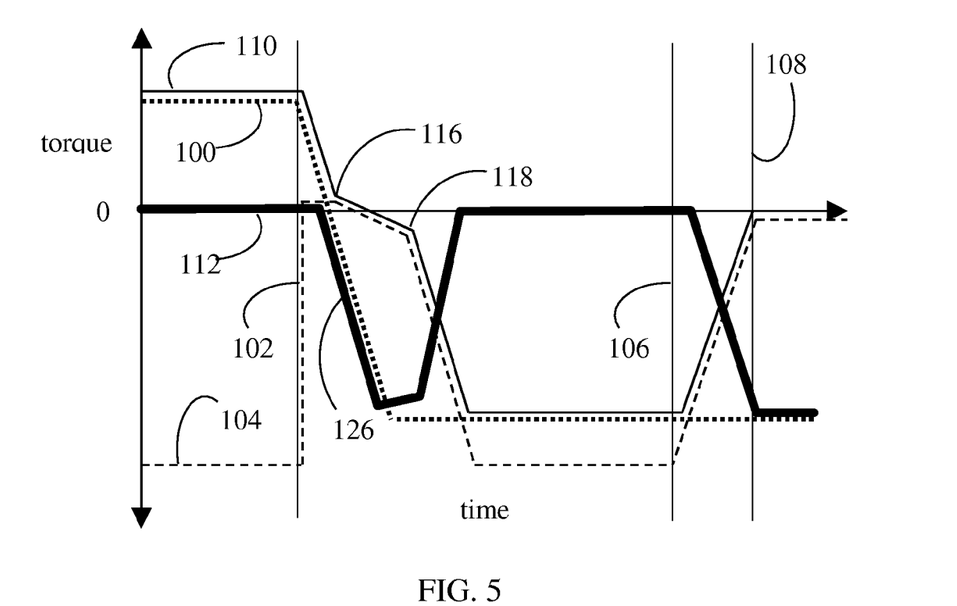
FIG. 5 is a graph illustrating a torque transition that mitigates the noise and torque disturbance of the lash crossing without delaying delivery of negative wheel torque.

FIG. 5 illustrates the results of a better control strategy. In response to release of the accelerator pedal at 102, the control strategy increases Regenerative Torque Limit 104 to a small positive value. Consequently, as the Net Wheel Torque Demand 100 drops below this small value, the friction brakes are applied to generate the demanded negative wheel torque as shown at 126. During the lash crossing phase between 116 and 118, the Regenerative Torque Limit 104 is equal to the powertrain torque. After the lash crossing phase, the control strategy rapidly reduced the Regenerative Torque Limit to its normal value. As the Regenerative Torque Limit 104 decreases, the powertrain torque 110 tracks the limit 104 and the friction brake torque increases toward zero. The rate of change of the Regenerative Torque Limit is set such that the powertrain torque and friction brake torque can be changed rapidly enough to keep up. Throughout the process, the delivered net wheel torque closely tracks the Net Wheel Torque Demand 100 while mitigating the adverse effects of a driveline lash crossing.

Figure 6:
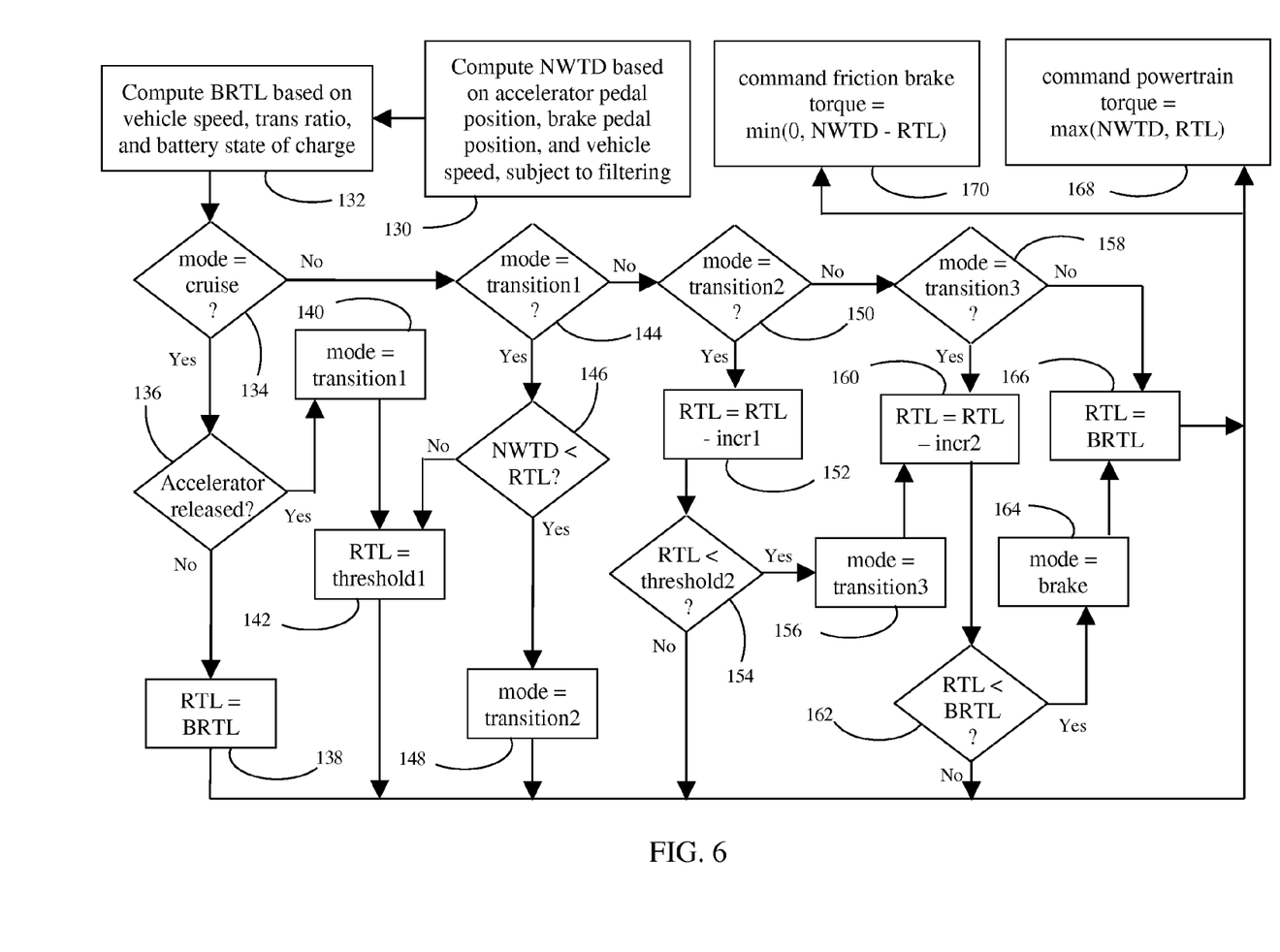
FIG. 6 is a flow chart for a method of controlling the powertrain of FIG. 1 and friction brakes to transition from positive torque to negative torque according to FIG. 5.

FIG. 6 is a flow chart for a process of controlling the powertrain torque and the friction brake torque to achieve the result illustrated in FIG. 5. This process is executed by controller 50 at regular intervals. Initially, a mode variable is set equal to "cruise." At 130, the Net Wheel Torque Demand is computed based on accelerator pedal position, brake pedal position, and vehicle speed. NWTD is positive when the accelerator pedal is depressed with the brake pedal released and is negative when the brake pedal is depressed with the accelerator pedal released. When both are released, NWTD may be slightly negative to simulate the engine braking characteristic of non-hybrid powertrains. Some filtering may occur to limit the rate of change of NWTD. At 132, a Baseline Regenerative Torque Limit (BRTL) is computed based on vehicle speed, transmission ratio, and battery state of charge. BRTL indicates the most negative torque that M/G 18 can exert at the wheels without overcharging the battery or adversely impacting brake feel.

If the mode is still cruise at 134, then the controller checks at 136 to see if the accelerator pedal has been released. If the accelerator pedal is still depressed, the Regenerative Torque Limit is set equal to the BRTL at 138. If the accelerator pedal has been released, the mode is updated to transition1 at 140. The transition1 mode corresponds to the interval between 102 and 116 in FIG. 5 during which the accelerator pedal has been released but the NWTD is still positive. While mode is equal to transition1, RTL is set to a small positive value, threshold1, at 142. Block 142 may be reached either immediately after the transition to transition1 state or because mode was equal to transition1 state as determined at 144 and the controller determines at 146 that it should remain in transition1 state. When the NWTD decreases below RTL near point 116 in FIG. 5, the controller changes the mode to transition2 at 148. While in the transition2 mode, as determined at 150, the RTL decreases at 152 by a small amount, incr1, at each time step. The calibratable value incr1 is selected small enough to effectively mitigate the lash crossing. When the RTL decreased below a small negative value, threshold2, at 118 in FIG. 5 and at 154 in FIG. 6, the controller changes the mode to transition3 at 156. In transition3 mode, either immediately after changing mode or as determined at 158, RTL decreased at a faster rate at 160. Calibratable value incr2 is substantially larger than incr1. Once RTL decreases below BRTL as determined at 162, the mode is updated to brake at 164. In brake mode, RTL is set equal to BRTL at 166.

Once RTL has been determined, the commanded powertrain torque and friction brake torque are calculated at 168 and 170 respectively. When RTL is less than (more negative than) NWTD, the powertrain torque is commanded to deliver the demanded torque and the brake torque is commanded to zero. When RTL is greater the NWTD, the powertrain is commanded to deliver RTL and the friction brakes are commanded to deliver the remainder. The friction brake command may include one or more closed loop terms in addition to the open loop term calculated at 170, but these terms would nominally be equal to zero.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A hybrid electric vehicle comprising:
   a driveline configured to deliver a powertrain torque to vehicle wheels;
   friction brakes configured to deliver a braking torque to the vehicle wheels;
   an internal combustion engine configured to deliver positive torque to the driveline;
   an electric motor configured to alternately deliver positive and negative torque to the driveline; and
   a controller programmed to respond to a request to transition from positive wheel torque to negative wheel torque by
      commanding the engine and electric motor to reduce the powertrain torque from an initial positive value to a positive threshold value at a first rate of change,
      commanding the brakes to exert a brake torque while commanding the engine and electric motor to reduce the powertrain torque from the positive threshold value to a negative threshold value at a second rate of change having a magnitude less than a magnitude of the first rate of change to mitigate a lash crossing disturbance, and
      commanding the brakes to increase the brake torque to zero while commanding the electric motor to reduce the driveline torque from the negative threshold value to a target negative value at a third rate of change having a magnitude greater than the magnitude of the second rate of change.

2. The vehicle of claim 1 wherein the driveline comprises a variable ratio transmission.

3. The vehicle of claim 2 wherein the driveline further comprises:
   a driveshaft fixedly coupled to an output of the transmission;
   a differential having an input fixedly coupled to the driveshaft; and
   first and second axles respectively fixedly coupled to first and second outputs of the differential and each fixedly coupled to a wheel of the vehicle wheels.

4. The vehicle of claim 1 wherein the controller is further programmed to respond to a vehicle speed decreasing below a threshold by commanding the brakes to increase a magnitude of the brake torque while commanding the electric motor to increase the powertrain torque to zero.

5. The vehicle of claim 1 wherein the brake torque is increased to zero at the third rate such that a total wheel torque remains constant.

6. A method of transitioning from positive wheel torque to negative wheel torque in a hybrid electric vehicle comprising:
   reducing a powertrain torque to a positive threshold value;
   exerting a brake torque while further reducing the powertrain torque through a zero level at a reduced rate of change of powertrain torque; and
   increasing the brake torque in conjunction with further reducing the powertrain torque to maintain a constant negative total wheel torque.

7. The method of claim 6 further comprising:
   in response to a vehicle speed decreasing below a threshold, decreasing the brake torque while increasing the powertrain torque to zero.

8. The method of claim 6 wherein the powertrain torque is initially generated by an internal combustion engine.

9. The method of claim 6 wherein the powertrain torque is initially generated by an electric motor.

10. A method of operating a vehicle comprising:
    at regular intervals,
       commanding an engine and a motor to deliver a powertrain torque equal to a maximum of a Net Wheel Torque Demand (NWTD) and a Regenerative Torque Limit (RTL), and
       commanding friction brakes to deliver a braking torque equal to a minimum of zero and a difference between the NWTD and the RTL; and
    in response to NWTD changing from positive to negative, reducing the RTL from a positive threshold to a negative threshold at a first rate to mitigate a lash crossing disturbance.

11. The method of claim 10 further comprising, after reducing the RTL to the negative threshold, further reducing the RTL at a second rate faster than the first rate.

12. The method of claim 10 further comprising, in response to a vehicle speed decreasing below a speed threshold, gradually increasing the RTL to zero.

13. The method of claim 10 further comprising sending the RTL and NWTD from a powertrain controller to a brake controller via a Controller Area Network.

* * * * *